(12) United States Patent
Ouyang et al.

(10) Patent No.: US 9,219,555 B2
(45) Date of Patent: Dec. 22, 2015

(54) EVALUATING DEVICE QUALITY

(71) Applicant: CELLCO PARTNERSHIP, Basking Ridge, NJ (US)

(72) Inventors: Ye Ouyang, Basking Ridge, NJ (US); Carol Becht, Boonton, NJ (US); Gopinath Venkatasubramaniam, Bridgewater, NJ (US); Christopher M. Schmidt, Branchburg, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 57 days.

(21) Appl. No.: 14/248,160

(22) Filed: Apr. 8, 2014

(65) Prior Publication Data
US 2015/0288465 A1 Oct. 8, 2015

(51) Int. Cl.
*H04B 17/18* (2015.01)
*H04B 17/29* (2015.01)

(52) U.S. Cl.
CPC ............... *H04B 17/18* (2015.01); *H04B 17/29* (2015.01)

(58) Field of Classification Search
CPC .. H04W 24/00; H04W 24/08; H04B 17/0042; H04B 17/0057; H04B 17/0065; H04B 17/18; H04B 17/29
See application file for complete search history.

(56) References Cited

U.S. PATENT DOCUMENTS

| | | | |
|---|---|---|---|
| 6,330,459 B1 * | 12/2001 | Crichton et al. | 455/562.1 |
| 2010/0061259 A1 * | 3/2010 | Larsson | 370/252 |
| 2011/0238826 A1 * | 9/2011 | Carre et al. | 709/224 |
| 2013/0258865 A1 * | 10/2013 | Kovvali et al. | 370/241 |
| 2013/0275346 A1 * | 10/2013 | Srikanteswara et al. | 706/12 |
| 2014/0141768 A1 * | 5/2014 | Javaid et al. | 455/423 |
| 2014/0280830 A1 * | 9/2014 | Ang et al. | 709/223 |
| 2015/0006706 A1 * | 1/2015 | Ellis et al. | 709/224 |
| 2015/0112791 A1 * | 4/2015 | Jain | 705/14.41 |

* cited by examiner

*Primary Examiner* — Lewis West

(57) ABSTRACT

Systems and methods for evaluating device quality are disclosed. Some implementations include receiving, operational parameters for a mobile device, where the operational parameters include data related to service disturbances in a plurality of areas of operational performance of the mobile device, computing, for each dimension of a plurality of dimensions, a curve indicative of a relationship between a device quality index (DQI) and operational parameters of the mobile device, where each dimension corresponds to a particular area of operational performance of the mobile device, identifying cliff points in each dimension of a multi-dimensional surface fitted to each computed curve, where each cliff point corresponds to a reduction in a user's quality of experience in a particular area of operational performance, and projecting the identified cliff points in each dimension of the multi-dimensional surface to determine a horizontal space in the multi-dimensional surface corresponding to a region of acceptable DQIs.

20 Claims, 11 Drawing Sheets

EVALUATING DEVICE QUALITY

CROSS REFERENCE TO RELATED APPLICATION

This application is related to U.S. patent application Ser. No. 14/248,191, entitled "FORECASTING DEVICE RETURN RATE," being filed concurrently herewith, the entire content of which is incorporated herein by reference.

BACKGROUND

In recent years, mobile device usage has significantly increased. Mobile devices, such as smartphones, are being designed and manufactured at a rapid rate to satisfy customer demand. Companies manufacturing mobile devices, or wireless network providers marketing the mobile devices, may use performance measurement to evaluate device quality. A key performance indicator (KPI) is a type of performance measurement. An organization may use KPIs to evaluate quality of a device. One approach to evaluate a device's quality is to manually test device KPIs using a quality testing tool. Then, if certain tested KPIs pass respective acceptable KPI values, the device is determined to have passed a quality test. Because each KPI may need to be separately evaluated, such methods may not be efficient. More importantly, such methods may not take into consideration all features indicative of a device's quality during a performance test. A combined impact from various device KPIs on device quality are also overlooked.

Thus, the resulting performance test may not be comprehensive. Furthermore, such methods are limited to evaluating device quality for mobile devices that have already been launched and are presently in use by customers.

As the foregoing illustrates, a new approach for evaluating device quality may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
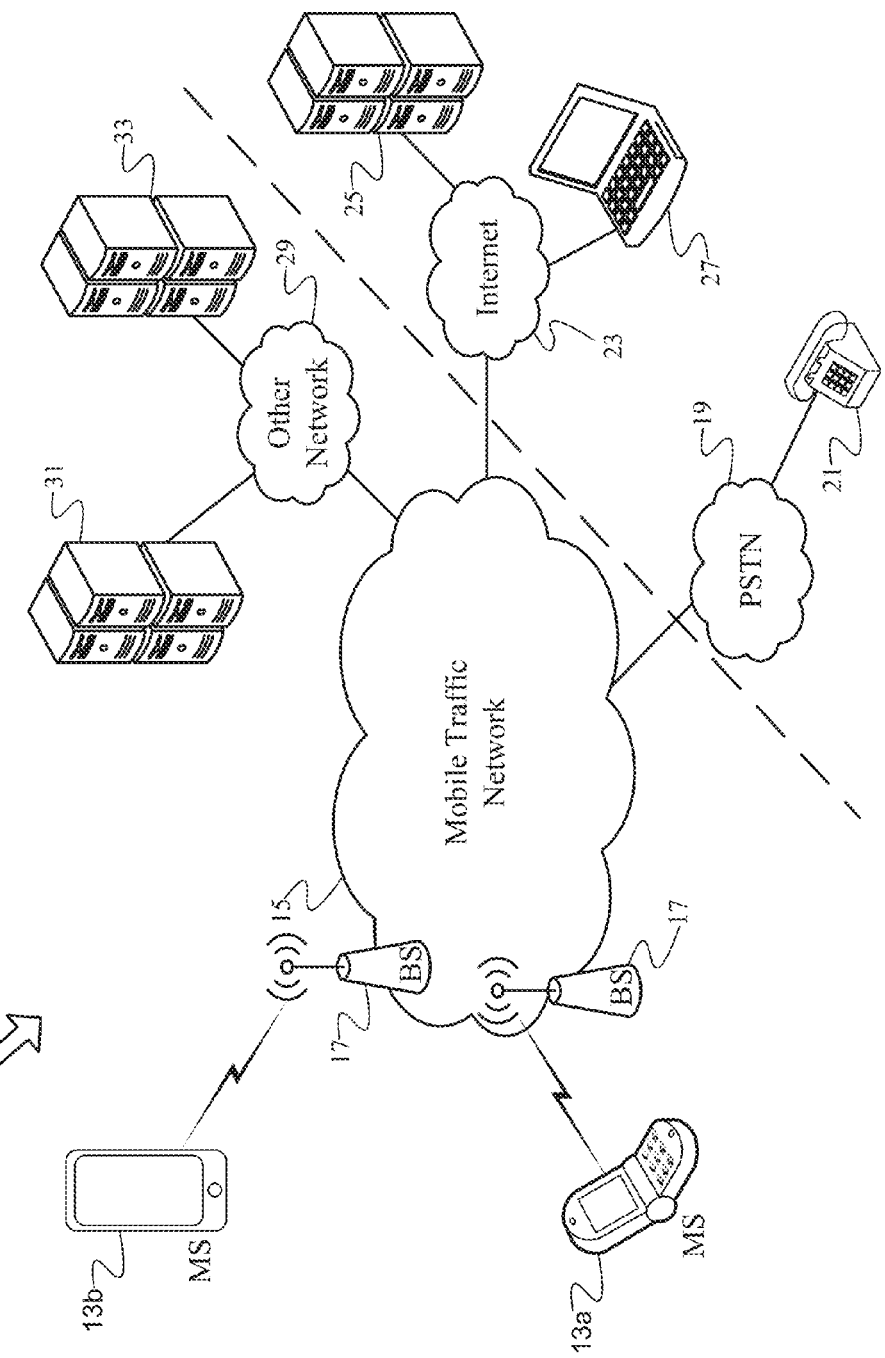
FIG. 1 is a high-level functional block diagram of an example of a system of networks/devices that provide various communications for mobile stations and support an example of evaluating device quality.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various implementations disclosed herein relate to evaluating device quality. The implementations provide a unified model and framework to evaluate device quality and can further provide a report describing the evaluated device quality. The report may include parameters considered in evaluating the device quality together with an indication of the device quality relative to pre-determined (or acceptable) quality levels. For example, the report may include an indication of whether the quality of the device is above-par, sub-par or on-par relative to pre-determined (or acceptable) quality levels. The report may be displayed on a user interface of a computing device. The implementations can jointly incorporate independent device performance indicators in the unified model to comprehensively evaluate device performance. The implementations can be used to estimate device quality for both pre-launch and post-launch devices regardless of which original equipment manufacturer (OEM) manufactured the devices.

In some implementations, one or more operational parameters for a mobile device are received at an analytics engine. The operational parameters can include data related to service disturbances in a plurality of areas of operational performance of the mobile device. The analytics engine can compute, for each dimension of a plurality of dimensions, a curve indicative of a relationship between a device quality index (DQI) of the mobile device for a particular dimension and operational parameters of the mobile device for the particular dimension. Each dimension of the plurality of dimensions can correspond to a particular area of operational performance of the mobile device.

The analytics engine then identifies cliff points in each dimension of a multi-dimensional surface fitted to each computed curve. Each cliff point corresponds to a reduction in a user's quality of experience in a particular area of operational performance represented by a corresponding dimension. The reduction may be associated with the service disturbances. The analytics engine then projects the identified cliff points in each dimension of the multi-dimensional surface to determine a horizontal space in the multi-dimensional surface corresponding to a region of acceptable DQIs. The analytics engine may receive a DQI associated with the mobile device and determining whether the received DQI is within the region of the acceptable DQIs. When the received DQI is determined to be the region of the acceptable DQIs, the analytics engine may determine that the mobile device is of acceptable quality. The analytics engine may generate, based on the projection, a device quality evaluation report for the plurality of areas of operational performance of the mobile device. In this way, for example, the disclosed implementations may evaluate device quality.

Reference now is made in detail to the examples illustrated in the accompanying drawings and discussed below.

FIG. 1 illustrates a system 10 offering a variety of mobile communication services, including communications for evaluation of device quality. The example shows simply two mobile stations (MSs) 13a and 13b as well as a mobile communication network 15. The stations 13a and 13b are examples of mobile stations that can be evaluated by the device quality evaluation service. However, the network will provide similar communications for many other similar users as well as for mobile devices/users that do not participate in the device quality evaluation service. The network 15 provides mobile wireless communications services to those stations as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard including the Global System for Mobile (GSM) communication standard, a Long Term Evolution (LTE) standard or the Evolution Data Optimized (EVDO) standard, a time division multiple access (TDMA) standard or other standards used for public mobile wireless communications. The mobile stations 13 can be capable of voice telephone communications through the network 15, and communications that may be needed to evaluate device quality, the exemplary devices 13a and 13b are capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13 via the Internet 23 may be with devices like those shown at 25 and 27 as well as with a variety of other types of devices or systems capable of data communications through various interconnected networks. The mobile stations 13a and 13b also can receive and execute applications written in various programming languages, as discussed more later.

Mobile stations 13 can take the form of portable handsets, tablets, smart-phones or personal digital assistants, although they may be implemented in other form factors. Program applications, including any application to assist in the device quality evaluation service can be configured to execute on many different types of mobile stations 13. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more analytics engine(s) 31 and a related authentication server 33 for the application service of server 31. In some implementations, analytics engine 31 may be an application server configured to execute any type of software application.

A mobile station 13 communicates over the air with a base station 17 and through the traffic network 15 for various voice and data communications, e.g. through the Internet 23 with a server 25 and/or with analytics engine 31. If the mobile service carrier offers the device quality evaluation service, the service may be hosted on a carrier operated analytics engine 31, for communication via the networks 15 and 29. Alternatively, the device quality evaluation service may be provided by a separate entity (alone or through agreements with the carrier), in which case, the service may be hosted on an application server such as server 25 connected for communication via the networks 15 and 23. Servers such as 25 and 31 may provide any of a variety of common application or service functions in support of or in addition to an application program running on the mobile station 13. However, for purposes of further discussion, we will focus on functions thereof in support of the device quality evaluation service. For a given service, including the device quality evaluation service, an application program within the mobile station may be considered as a 'client' and the programming at 25 or 31 may be considered as the 'server' application for the particular service. In some implementations, the device quality evaluation service may operate entirely at server 25 or 31.

To insure that the application service offered by analytics engine 31 is available to only authorized devices/users, the provider of the application service also deploys an authentication server 33. The authentication server 33 could be a separate physical server as shown, or authentication server 33 could be implemented as another program module running on the same hardware platform as the analytics engine 31. Essentially, when the server application (analytics engine 31 in our example) receives a service/data request from a client application on a mobile station 13, the server application provides appropriate information to the authentication server 33 to allow the authentication application 33 to authenticate the mobile station 13 as outlined herein. Upon successful authentication, the server 33 informs the analytics engine 31, which in turn provides access to the service via data communication through the various communication elements (e.g. 29, 15 and 17) of the network 10. A similar authentication function may be provided for the device quality evaluation service offered via the server 25, either by the server 33 if there is an appropriate arrangement between the carrier and the operator of server 25, by a program on the server 25 or via a separate authentication server (not shown) connected to the Internet 23.

In some implementations, one or more operational parameters for mobile station 13a are received at the analytics engine 31. The operational parameters can include data related to service disturbances in a plurality of areas of operational performance of the mobile station 13a. The analytics engine 31 can compute, for each dimension of a plurality of dimensions, a curve indicative of a non-linear relationship between a DQI of the mobile station 13a for a particular dimension and operational parameters of the mobile station 13a for the particular dimension. Each dimension of the plurality of dimensions can correspond to a particular area of operational performance (e.g., network performance, browser performance, signalling performance, etc.) of the mobile station 13a. The analytics engine 31 then identifies cliff points in each dimension of a multi-dimensional surface fitted to each computed curve. Each cliff point corresponds to a reduction in a user's quality of experience in a particular area of operational performance represented by a corresponding dimension. The reduction may be associated with the service disturbances which can be represented by service quality indicators. The analytics engine 31 then projects the identified cliff points in each dimension of the multi-dimensional surface to determine a horizontal space in the multi-dimensional surface corresponding to a region of acceptable DQIs. The analytics engine 31 may receive a DQI associated with the mobile station 13a and determining whether the received DQI is within the region of the acceptable DQIs. When the received DQI is determined to be the region of the acceptable DQIs, the analytics engine 31 may determine that the mobile station 13a is of acceptable quality. When the received DQI is not determined to be the region of the acceptable DQIs, the analytics engine 31 may determine that the mobile station 13a may not be of acceptable quality. In this way, for example, the disclosed implementations may evaluate device quality (e.g., quality of mobile device 13a). Exemplary computations by the analytics engine 31 are discussed further and, for example, with reference to FIG. 8.

Figure 2:
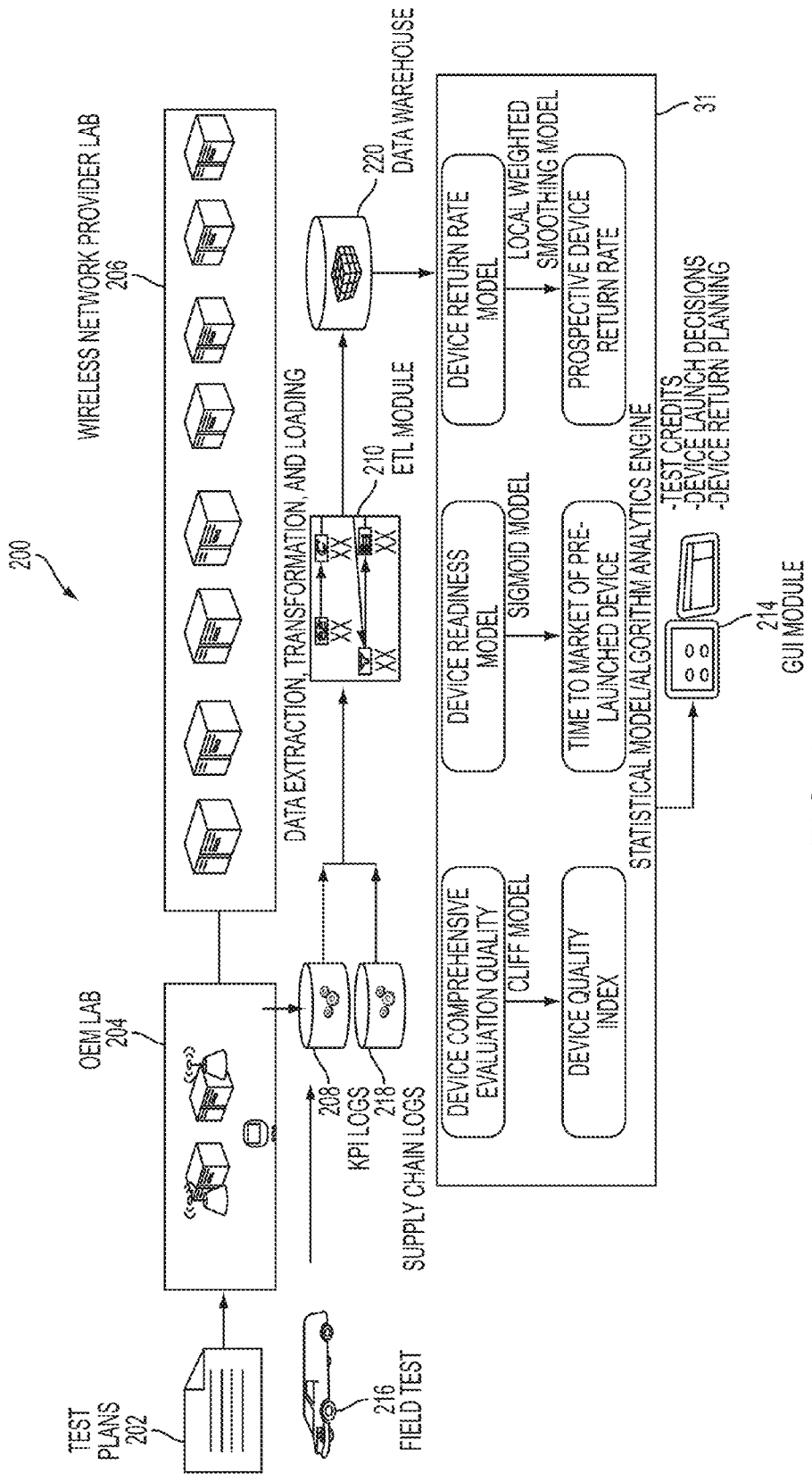
FIG. 2 is an exemplary overall framework that can be used to obtain and store operational parameters related to a mobile device.

FIG. 2 illustrates an exemplary overall framework 200 that can be used to obtain and store operational parameters related to the mobile station 13a. The overall framework 200 shows test plans 202, original equipment manufacturer (OEM) lab 204, wireless network provider lab 206, KPI logs 208, Extract-Transform-Load (ETL) module 210, analytics engine 31 and graphical user interface module (GUI) module 214, field tester 216, supply chain logs 218 and data warehouse 220.

In some implementations, the framework 200 may be implemented by an organization, such as a wireless network provider. In this example, the wireless network provider may operate the framework 200 to determine the quality of mobile devices that have been manufactured by certain manufacturers for customers of the wireless network provider. In other implementations, the framework 200 may be implemented by any other organization or company to evaluate quality of any device. In other words, the framework 200 is not limited to wireless network providers and mobile devices. Furthermore, it is to be appreciated that one or more components illustrated in FIG. 2 may be combined. Operations performed by one or more components may also be distributed across other components.

With reference to FIG. 2 and in some implementations, test plans 202 may include, but are not limited to, data and associated guidelines on how to test the mobile station 13a (or any other device) for quality. The test plans may include machine-readable instructions as well as human-readable instructions. For example, the test plans may be read by a human tester or may be provided to a processor-based computer to perform one or more tests on the mobile station 13a. Such a test may be performed by a processor-based computer to determine certain operational parameters and/or key performance indicators of the mobile station 13a. In some examples, testing of the mobile station 13a may be performed at OEM lab 204. The OEM lab 204 may be a testing facility that is operated by a manufacturer of the mobile station 13a. The OEM lab 204 may be operated by one or more human testers and may include one or more testing stations and testing computers. The wireless network provider lab 206 may be a testing facility similar to the OEM lab 204 but may be operated by a wireless network provider that provides network services for the mobile station 13a. OEM lab 204 and wireless network provider lab 206 may be electronically connected to network 29 and/or 23 for communication with other components illustrated in FIG. 1. Simply stated, the general purpose of the OEM lab 204 and wireless network provider lab 206 can be to perform one or more tests or measurements on the mobile station 13a to determine operational parameters associated with the mobile station 13a. It is to be appreciated that the implementations are not limited to a single mobile station 13a, but can operate to test and evaluate any number of mobile stations in sequence or in parallel.

In some implementations, KPI logs 208 may include, but are not limited to, data from field tester 216 and OEM lab 204. KPI logs 208 can include KPI data including, but not limited to, mean time between device failure, mean time to device repair, etc. and any other performance parameter. The field tester 216 may test the mobile station 13a in actual situations reflecting a real-world use of the mobile station 13a. KPI logs 208 may also include data from wireless network provider lab

206. As discussed above, data from OEM lab 204 and the wireless network provider lab 206 can include, but are not limited to, operational parameters (e.g., network connectivity, browser rendering quality, signaling parameters, etc.) associated with the mobile station 13*a*. In some implementations, the data from the KPI logs 208 and the supply chain logs 218 can be retrieved or extracted by the ETL module 210. The ETL module 210 may extract, transform and load transformed data into data warehouse 220. Data transformations may include, but are not limited to, re-formatting of the data into a common or open data format.

Figure 4:
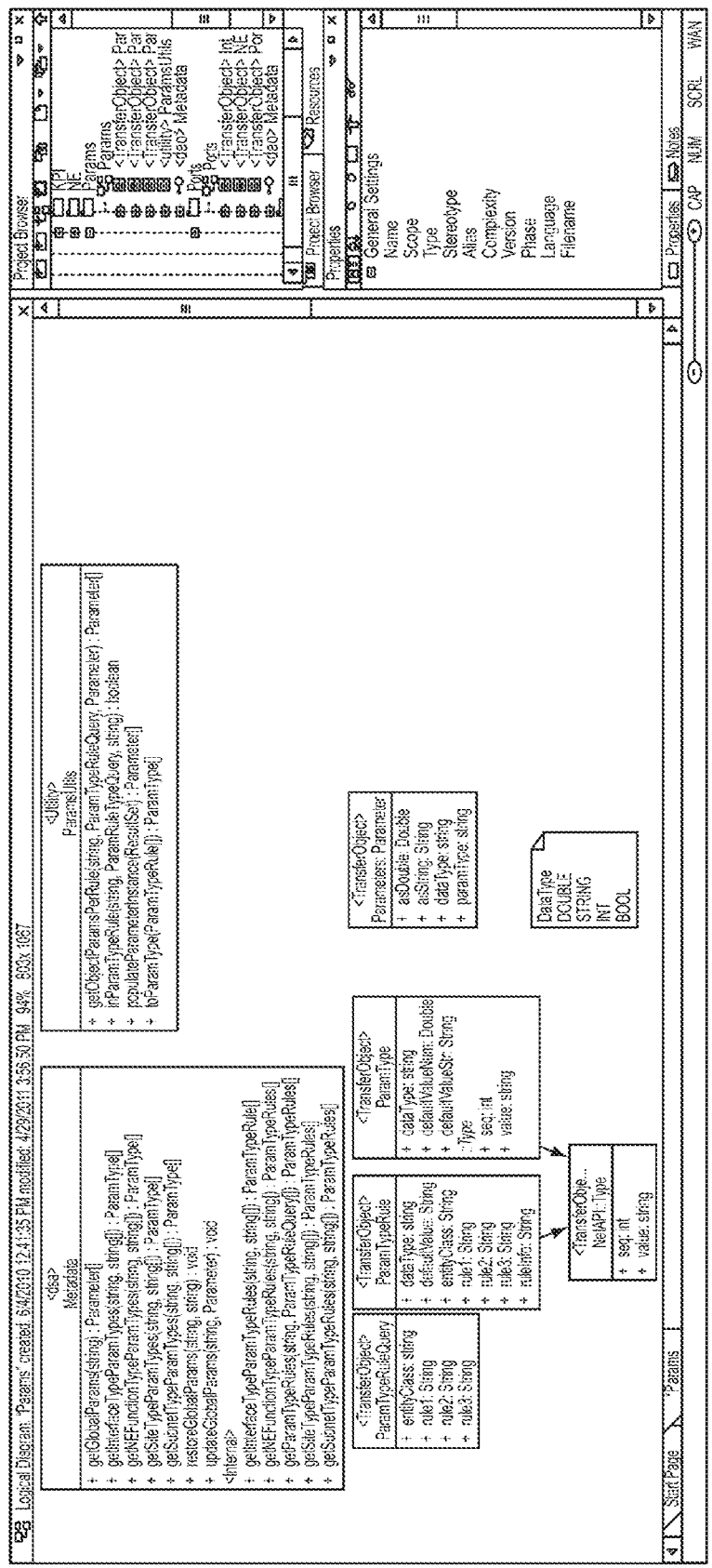
FIG. 4 is an exemplary interface to define relations between data attributes in metadata.

In some implementations, ETL module 210 may receive data as data files in a particular data format (e.g., .drm file format). The ETL module 210 may use a schema to extract data attributes from a .drm file, then format the data, transform the data, and finally load or store the data to the data warehouse 220. The data warehouse 220 may also include metadata associated with the data received from the ETL module 210. Metadata can specify properties of data. In this way, the data warehouse 220 may include, but is not limited to, transformed data field tester 216, the OEM lab 204 and the wireless network provider lab 206. The data from the data warehouse 220 may be read by the analytics engine 31 to evaluate quality of the mobile station 13*a* using the exemplary methods discussed below. In some implementations, data from the data warehouse 220 may be provided by the data warehouse 220 to the analytics engine 31. The metadata in the data warehouse 220 can define data attributes as well as their relations. The metadata may include two types of metadata; performance data attribute and a configuration data attribute. Performance data attributes may include, but are not limited to, device KPI name, device KPI unit, device KPI threshold (max and limit value), wireless network (RF) KPI name, RF KPI unit, RF KPI threshold (max and limit value) etc. Configuration data attributes may include, but are not limited to, device name, OEM name, device type, hardware configuration parameters, software parameters, sales data, returns data (per cause code), etc. Once data attributes are defined in a metadata file, their relations can be defined. FIG. 4 illustrates an exemplary interface to define the relations between data attributes in the metadata. The interface can be an easy to use web-based interface. For example, a user may use the project browser of the interface to select one or more performance data parameters (e.g., KPIs) and then use logical diagrams to configuration of mappings between both standard and proprietary data formats. Furthermore, the interface can allow customizing conversion of data types. In addition, a visualization of derived mappings between source and target formats can also be provided.

In some implementations, the analytics engine 31 includes one or more processors, storage and memory to process one or more algorithms and statistical models to evaluate quality of the mobile station 13*a*. The analytics engine 31 may train and mine the data from ETL module 210. As an example, a training set can be a set of data used to discover potentially predictive relationships. Training sets are used in artificial intelligence, machine learning, genetic programming, intelligent systems, and statistics. A training set can be implemented to build an analytical model, while a test (or validation) set may be used to validate the analytical model that has been built. Data points in the training set may be excluded from the test (validation) set. Usually a dataset is divided into a training set and a validation set (and/or a 'test set') in several iterations when creating an analytical model. In this way, the analytics engine 31 may determine models to evaluate device quality. The analytics engine 31 can further provide a report describing the evaluated device quality. The report may include parameters considered in evaluating the device quality together with an indication of the device quality relative to pre-determined (or acceptable) quality levels. For example, the report may include an indication of whether the quality of the device is above-par, sub-par or on-par relative to pre-determined (or acceptable) quality levels. The report may be displayed on a user interface of a computing device. The report may be used to modify aspects related to a supply chain or a manufacturing chain of the mobile station 13*a*. For example, when it is determined that the network performance of the mobile station 13*a* is sub-par then manufacturer of the mobile station 13*a* may take actions needed to change certain network components of the mobile station 13*a* during manufacturing or improve quality control for the network components. In another example, when it is determined that the browser performance of the mobile station 13*a* is sub-par then the manufacturer may take actions needed to change the browser of the mobile station 13*a* during software integration. Alternatively, the manufacturer may take actions needed to improve browser testing during software integration.

In some implementations, the device quality evaluation report may be automatically provided by the analytics engine 31 to manufacturing and supply chain components to alter their processes and operations without human intervention. In this scenario, the device quality evaluation report may include or may be replaced by instructions from the analytics engine 31 to alter operation of the manufacturing and supply chain components. The analytics engine 31 may continually monitor and adjust manufacturing and supply chain component operations based on evaluated device quality. For example, a device that programs firmware for network components on the mobile station 13*a* may be instructed by the analytics engine 31 to update firmware settings to improve sub-par network performance for the mobile station 13*a*. Also, for example, a robotic arm integrating or soldering components on the mobile station 13*a* may be instructed by the analytics engine 31 to increase speed or rate of operation to meet a particular supply demand of the mobile station 13*a*. In this way, the analytics engine 31 may increase efficiency of manufacturing and supply chain processes for the mobile station 13*a*.

In some implementations, the device quality evaluation report may be automatically transmitted by the analytics engine 31 to one or more computers operated at stores that sell/market the mobile station 13*a* to end users. In this scenario, the device quality evaluation report may include human readable instructions to update software on particular devices, alter certain hardware components, prevent sale of certain devices identified by their model number(s) and any other instructions/guidance related to devices sold by the stores. The device quality evaluation report may be used by store employees to anticipate issues that may be associated with a particular manufactured batch of the mobile station 13*a*. The store employees may also use the reports to issue device recall requests to end users so that known issues with devices may be resolved before they are reported by the end-users. In some implementations, a new device quality evaluation report may be transmitted by the analytics engine 31 to the one or more computers at pre-determined intervals (e.g., hourly, daily, weekly, monthly, etc.).

Figure 3:
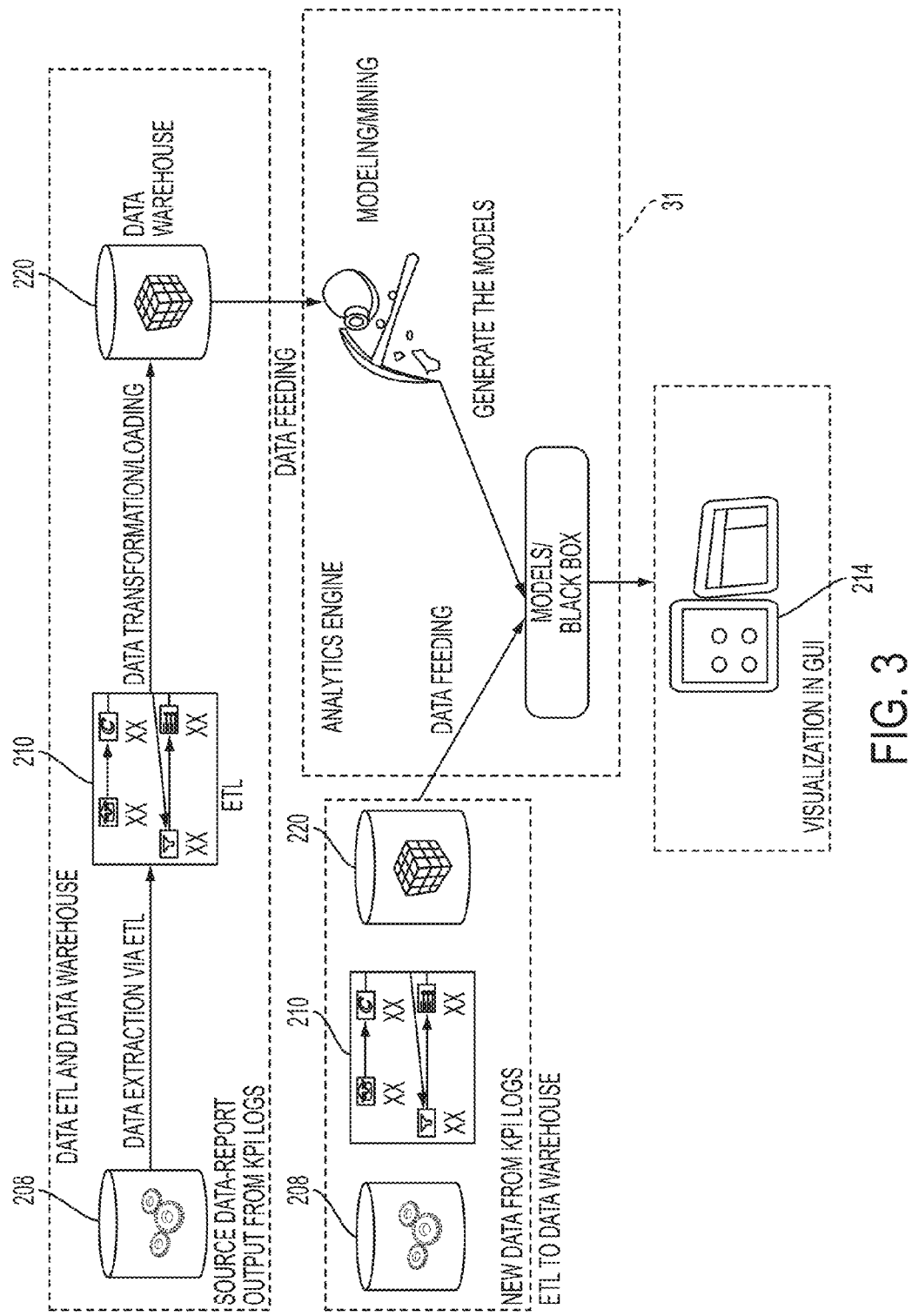
FIG. 3 is an exemplary incremental learning in an analytics engine.

In some implementations, open interfaces (e.g., application programming interfaces (APIs)) may be provided to vendors for reading/writing data between the ETL module 210 and the analytics engine 31 and for visualizing analytics results between the analytics engine 31 and GUI 214. In some implementations, the wireless network provider may provide a third-party vendor access to the analytics engine 31. In some implementations, data may be processed incrementally by the analytics engine 31 for instantaneous learning. Incremental learning is a machine learning paradigm where a learning process takes place whenever new example(s) emerge and adjusts what has been learned according to the new example(s). Incremental learning differs from traditional machine learning in that incremental learning may not assume the availability of a sufficient training set before the learning process, but the training examples appear over time. Based on this paradigm, the algorithms utilized by the analytics engine 31 may be automatically updated by re-training the data processed by the analytics engine 31. In some implementations, a dynamic sliding window method may be used to provide data from the ETL module 210 to the analytics engine 31 for algorithm training by the analytics engine 31. The dynamic sliding window may be used by the ETL module 210 to incrementally provide, for example, operational parameters from the mobile station 13a to the analytics engine 31. For example, and with reference to FIG. 3, the analytics engine 31 may receive data incrementally from ETL module 210 and data warehouse 220 as well as data from an KPI tool or KPI logs 208. The analytics engine 31 can incrementally auto-learn and update algorithms (and related formulae) for mathematical models so that the models conform to latest data received from the ETL module 210.

One or more outputs of the analytics engine 31 may be provided to the GUI 214 for display. As an example, the GUI 214 may rendered on a mobile device display, laptop display, personal computer display, etc. (e.g., tablet computer, smartphone, etc.) that may display data provided by the analytics engine 31. In some implementations, the GUI 214 can be used to visualize analytical results from analytics engine 31. As an example, results from the analytics engine 31 may be visualized as terms of charts, animations, tables and any other form of graphical rendering.

In some implementations, GUI 214 may display a data model, algorithm(s), and inter-component communications. The GUI 214 may include a dashboard based to support multiple applications while providing a unified look and feel across all applications. The GUI 214 may display reports in different formats (e.g., .PDF, .XLS, etc.). The GUI 214 may allow open APIs and objects for creation of custom report(s) by users. The GUI 214 may keep the internal schema for the data warehouse 220 hidden from users and provide GUI features that include, but are not limited to, icons, grouping, icon extensions and administration menu(s). Overall, the GUI 124 can provide a consistent visual look and feel and user friendly navigation.

In some implementations, the analytics engine 31 can be implemented as a device analytics tool. Such a device analytics tool can be, for example, an extension of a Diagnostic Monitoring Tool to further evaluate device quality for any pre-launched devices. Diagnostics can refer to a device's self-diagnostic and reporting capability. Diagnostic or KPI tools can give a device tester or repair technician access to status of various device sub-systems. Diagnostic tools can use a standardized digital communications port to provide real-time data.

The analytics engine 31 can be a tool to apply statistical modeling algorithms to study device quality, evaluate device readiness, and forecast device return rate etc. More statistical models can be embedded/stored in the analytics engine 31 based on business needs. The analytics engine 31 can allow a device quality team to investigate device quality from several aspects, including, but not limited to, device quality, device readiness and device return rate. For example, when evaluating device quality, a cliff model can be developed by the analytics engine 31 to comprehensively evaluate device quality in terms of a device quality index which reflects user's experience with device quality in high dimensional spaces. An exemplary, device quality evaluation using a cliff model is discussed further below with respect to FIG. 8.

When evaluating device readiness, a sigmoid model can be developed by the analytics engine 31 to forecast the time to market for a given pre-launched device. When evaluating device return rate, a model such as a Local Weighted Scatter-Plot Smoothing (LOESS) model can developed by the analytics engine 31 to forecast potential device return rate for a given pre-launched device. This model can also be leveraged by the analytics engine 31 to forecast device return rate for a post-launched device.

In some implementations, the analytics engine 31 supports the functionality of instantaneous data extraction from an KPI module (e.g., KPI logs 208) as well as instantaneous data transformation and loading. Instantaneous data processing in ETL module 210 can refer to access to OBDM data library (e.g., KPI logs 208) for data extraction. Data obtained from the KPI logs 208 may be a quasi-instant step. The ETL module 210 can detect new data that is uploaded to KPI logs 208. The ETL module 210 can perform operations immediately once the new data file is detected in KPI logs 208. Appropriate outlier exclusion approaches may be implemented in the ETL module 210 to exclude and convert outliers, or data that may not conform to known formats, in raw data files. In some implementations, a wireless network provider may provide the outlier detection algorithms to a vendor that provides OBDM tools to collect data into KPI logs 208.

Figure 5:
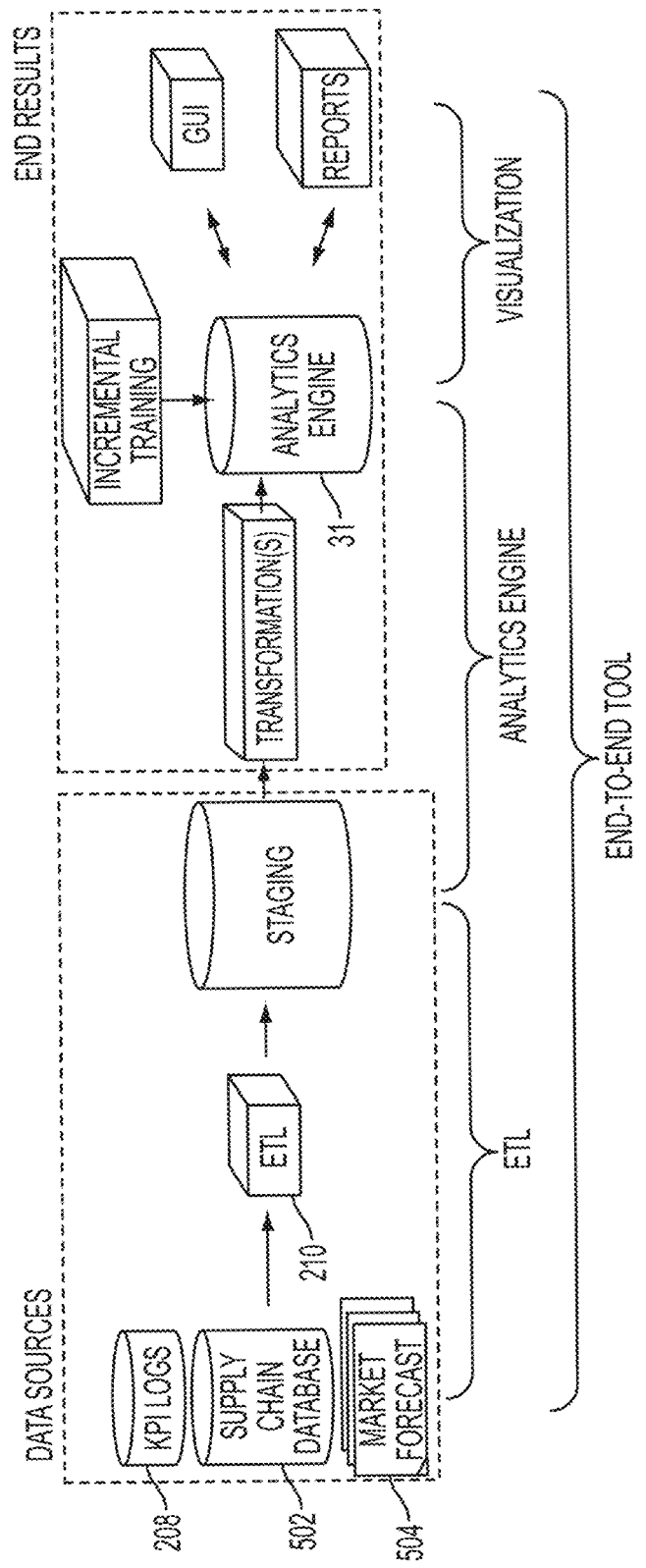
FIG. 5 is exemplary data sources that can provide data to an extract-transform-load (ETL) module and the analytics engine.

FIG. 5 illustrates different data sources of the analytics engine 31. In some implementations, there can be three primary data sources to ETL module 210 and the analytics engine 31. These data sources include KPI logs 208, supply chain database 502, and market forecast data 504. The KPI logs 208 may be a primary data source to obtain performance data. There can be two data formats available in the KPI logs 208 for the analytics engine 31. One format can be a .DRM format, which can be used to store an original log file uploaded by KPI tool users to an KPI data library. The other format can be a .CSV file, which can be used to store a report generated by an KPI tool. It can be viewed as a "processed log" via a KPI tool.

Supply chain database 502 can store data related to device rate of return. In some implementations, the wireless network provider can provide device returns data extracted from a logistics dashboard associated with the supply chain database 502 in a .CSV file. Queries and scripts may be run by ETL module 210 to extract raw data from the supply chain database 502 and save the data as .CSV files. ETL module 210 may accept and feed the data to the analytics engine 31 for further processing.

In implementations, market forecast data 504 can provide the sales data per device per month. The market forecast data 504 can be obtained from a pre-existing database of forecasted sales data that may be generated by a marketing team. This dataset can be merged with the device returns data from the supply chain database 502. Granularity of load-performance data can be seconds, minutes, or busy hour intervals that may indicate when a device supply chain is active in tasks related to device issue resolution. Returns data and sales data may have granularity of weeks or months.

In some implementations, after data is processed by the ETL module 210 but before it is passed to staging, a step of outlier exclusion may be implemented by the ETL module 210. In some implementations, an inter-quartile range (IQR)

algorithm may be implemented in the ETL module 210 to exclude outliers. In descriptive statistics, the interquartile range, also called the midspread or middle fifty, is a measure of statistical dispersion, being equal to the difference between the upper and lower quartiles.

In some implementations, the ETL module 210 can define a unified target file. Each data attribute in metadata can be mapped by the ETL module 210 to a given column in the target file. The target file is generated as the output file by the ETL module 210 and then provided by the ETL module 210 to the analytics engine 31 for further data mining and data processing. This target file can be utilized by the analytics engine for statistical analysis (e.g., statistical analysis of the mobile station 13a). In some implementations, the ETL module 210 may need to split the target file into several files such as a performance file, a configuration file, etc. The target file may be split when the file size is larger than a specified threshold value. The performance file may include data related to performance of hardware (e.g., memory components) and software (e.g., executing applications) of the mobile station 13a. The configuration file may include data associated with certain device settings (e.g., user defined settings) of the mobile station 13a.

As noted earlier, device quality can be considered to be a comprehensive index to reflect a user's experience with device quality in terms of many dimensions. These dimensions can include different areas of device performance such as applications operating on the mobile station 13a, hardware performance, software performance, network performance, signaling performance, etc. of the mobile station 13a.

Figure 6:
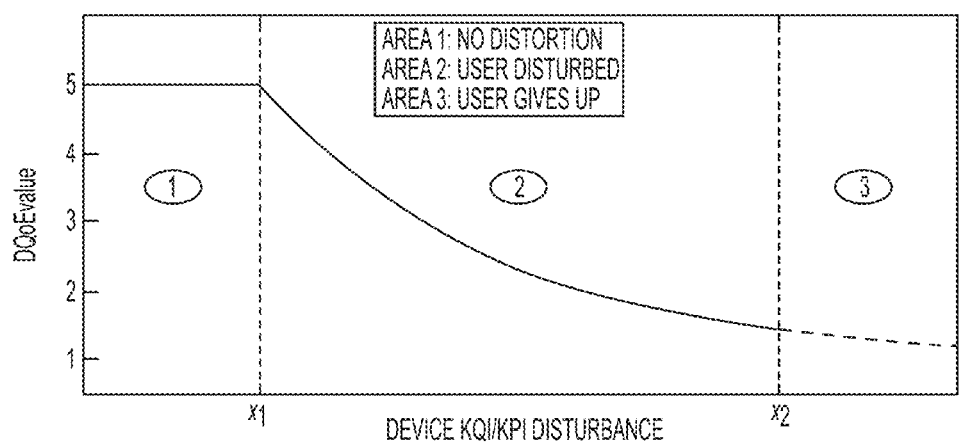
FIG. 6 is an exemplary relationship between a device quality index (DQI) and service disturbance for an application.

FIG. 6 is an exemplary relationship between DQI and service disturbance. The service disturbance can be, for example, associated with a web browser application that is being utilized by a user. Referring to FIG. 6, region 1 illustrates a region of constant and optimal DQI. In region 1, a slight growth of quality disturbance (0 to X1) may not affect DQI at all. As an example, a slight growth of quality disturbance may occur when the web browser displays content at a slower rate in comparison to a rate that is generally experienced by the user. Region 2 illustrates an area of sinking DQI. As an example, a slight growth of quality disturbance may occur when the web browser intermittently displays content at a much slower rate in comparison to a rate that is generally experienced by the user. Quasi-optimal device quality of experience (DQoE) may not be maintained when exceeding threshold X1. As a result DQI, which corresponds to DQoE, sinks in terms of its negative gradient. Region 3 illustrates a region of unacceptable DQI. In region 3, device service is unacceptably bad and the browser service may stop working. In FIG. 6, the shape of the DQI curve is given consideration by the analytics engine 31. For example, it can be determined whether the shape is linear, 2nd order polynomial, 3rd order polynomial, exponential, logarithmic, etc.

Device quality and key quality indicators (KQI) or analogous KPIs can present a relationship of exponential interdependency. By inserting measureable/computable device KQI/KPI values into an exponential formula derived by the analytics engine 31, their impact on DQI can be assessed by the analytics engine 31. The sensitivity of the DQI can be more pronounced as the experienced quality increases. For example, if DQI is very high, a small service disturbance may significantly decrease the DQI. Also, for example, if DQI is already low, a further service disturbance may not significantly decrease the DQI. As a result, it may be determined that DQoE and KQI/KPIs represent a relationship of exponential interdependency.

Furthermore, it may be assumed that change of DQI to device key quality index (DKQI) or quality of service (QoS)) may depend on the current level of DQoE (e.g., alpha*DQoE), given a certain amount of change of the DKQI (or QoS) value (or beta). Then, based on example illustrations from FIGS. 7A and 7B, it can be proved that DQI presents a negative exponential relationship to service quality disturbance. At an initial time, service disturbance (close to null point) can be very small. For example, jitter, latency, packet loss, etc. can be imperceptible and invisible by device users. However, once the disturbance traverses a particular threshold, user experience can plunge sharply.

Figure 7A:
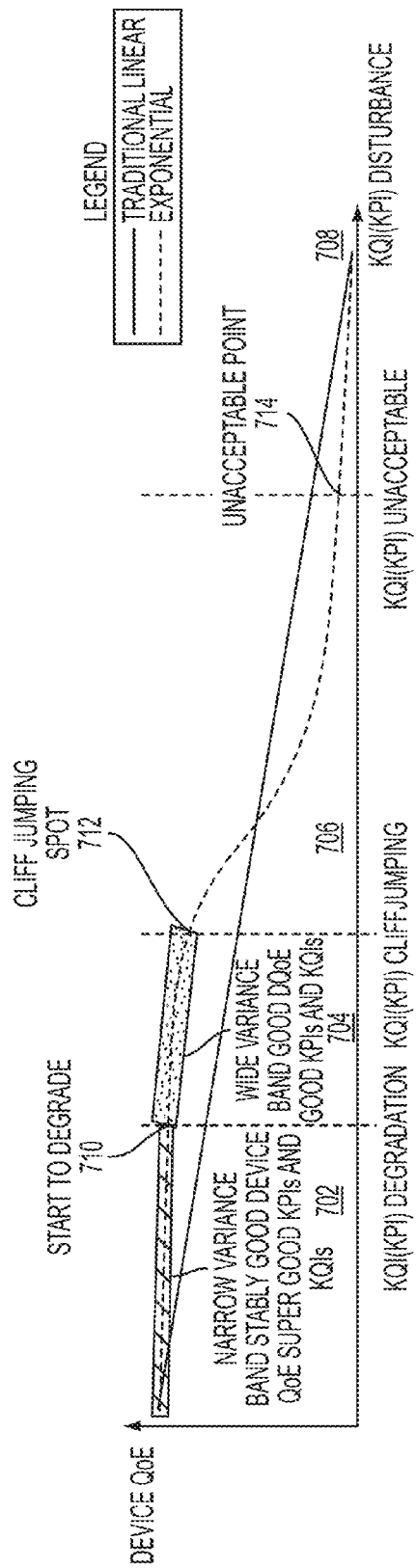
FIGS. 7A and 7B are exponential relationships between DQI and service quality disturbances.

Referring to FIG. 7A, region 702 illustrates a narrow variance band with stable and "good" device quality of experience relative to other quality of experience values or parameters These "good" quality of experience parameters may be specified as baseline (or acceptable) parameters by a manufacturer of the device. In region 702, the device KPIs/KQIs are very good in comparison to regions 704, 706 and 708. At point 710, the DQoE starts to degrade. Region 704 illustrates a wide variance band with "good" device quality of experience. In region 704, the device KPIs/KQIs are very good in comparison to the other regions 706 and 708. At point 712, the DQoE starts to degrade significantly. Accordingly, region 706 represents a region of poor DQoE. At point 714, KPI value becomes unacceptable and DQoE degrades into an unacceptable region represented by region 708.

Figure 7B:
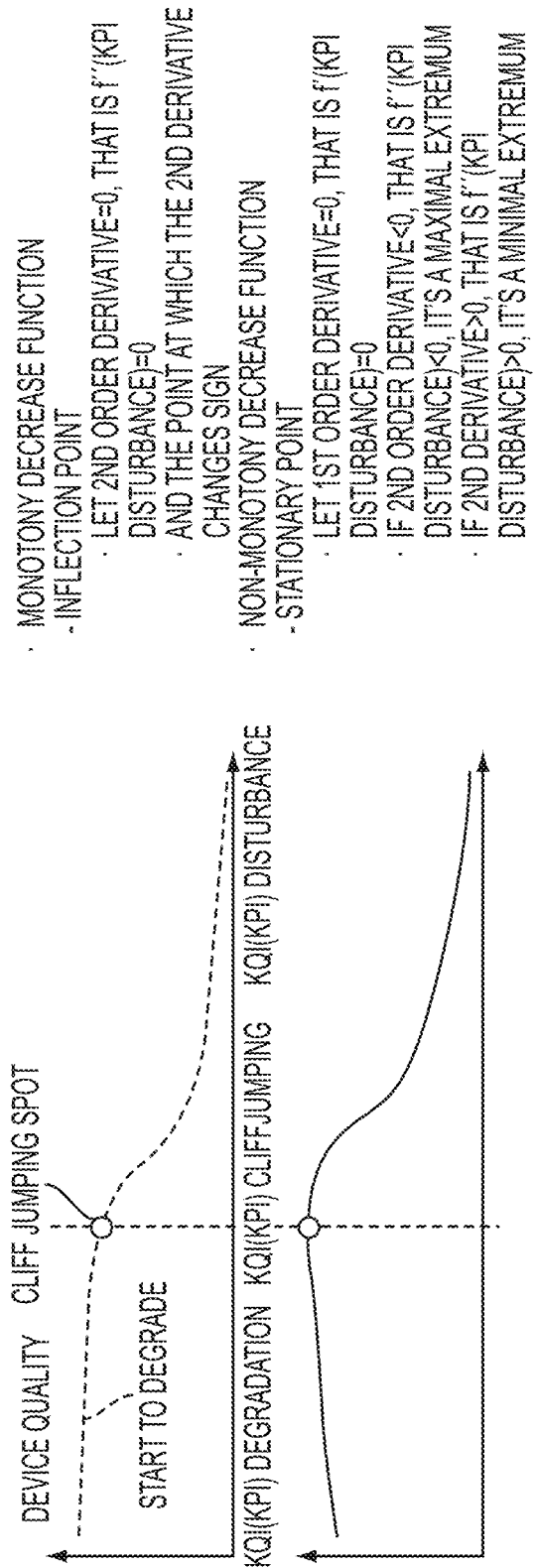

Referring to FIG. 7A, when DQoE is represented by a monotonic decrease function with an inflection point, the $2^{nd}$ order derivative of the KPI disturbance can be represented by zero. Generally, the second derivative measures how the rate of change of a quantity is itself changing. The point at which the second derivative changes sign can be considered to be the inflection point. In calculus, the first derivative can indicate whether a function is increasing or decreasing, and by how much it is increasing or decreasing. The second derivative, or the second order derivative, of a function "f" is the derivative of the derivative of function f. Referring to FIG. 7B, when DQoE is represented by a non-monotonic decrease with a stationary point, the $1^{st}$ order derivative of the KPI disturbance can be represented by zero. Then, if the $2^{nd}$ order derivative of the KPI disturbance is less than zero, then the stationary point represents a maximal extreme. However, if the $2^{nd}$ order derivative of the KPI disturbance is greater than zero, then the stationary point represents a minimal extreme.

While the first derivative can tell us if the function is increasing or decreasing, the second derivative tells us if the first derivative is increasing or decreasing. If the second derivative is positive, then the first derivative is increasing, so that the slope of the tangent line to the function is increasing. We see this phenomenon graphically as the curve of the graph being concave up, that is, shaped like a parabola open upward. Likewise, if the second derivative is negative, then the first derivative is decreasing, so that the slope of the tangent line to the function is decreasing. Graphically, we see this as the curve of the graph being concave down, that is, shaped like a parabola open downward.

Assume the change of DQoE to DKQI (or QoS) depends on the current level of DQoE (alpha*DQoE), given a certain amount of change of the DKQI (or QoS) value (beta).

Accordingly, we have:

$$\frac{\partial DQoE}{\partial DKQI} \sim a \cdot DQoE + \beta \qquad (1)$$

$$\frac{\partial DQoE}{a \cdot DQoE + \beta} \sim \partial DKQI \qquad (2)$$

$$\int \frac{\partial DQoE}{a \cdot DQoE + \beta} \cdot dDQoE \sim \int \partial DKQI \cdot dKQI \quad (3)$$

$$\Rightarrow DQoE = A \cdot e^{-B \cdot DKQI} + C \quad (4)$$

Hence, based on the exemplary relationships noted above in equations (1) through (3), DQI, corresponding to DQoE, presents a negative exponential relationship to service quality disturbance as illustrated in equation (4). For example, at the beginning of a service disturbance (close to a null point) a drop in DQI may be small or imperceptible. Particularly, jitter, latency, packet loss etc. can imperceptible to device users. However, once the service disturbance increases beyond a particular threshold, user experience will likely plunge significantly. This relationship is captured by equation (4).

In some implementations, one or more operational parameters for mobile station 13a are received at the analytics engine 31. The operational parameters can include data related to service disturbances in a plurality of areas of operational performance of the mobile station 13a. The analytics engine 31 can compute, for each dimension of a plurality of dimensions, a curve indicative of a relationship between a device quality index (DQI) of the mobile station 13a for a particular dimension and operational parameters of the mobile station 13a for the particular dimension. Each curve may be computed using exemplary equation (4) noted above. Each dimension of the plurality of dimensions can correspond to a particular area of operational performance of the mobile station 13a. Overall, the curves computed by the analytics engine 31 represent an exponential multi-dimensional surface. As discussed below, in the multi-dimensional surface, the analytics engine 31 can identify the cliff jumping spot in each dimension where users' device quality experience may start to degrade.

Figure 8:
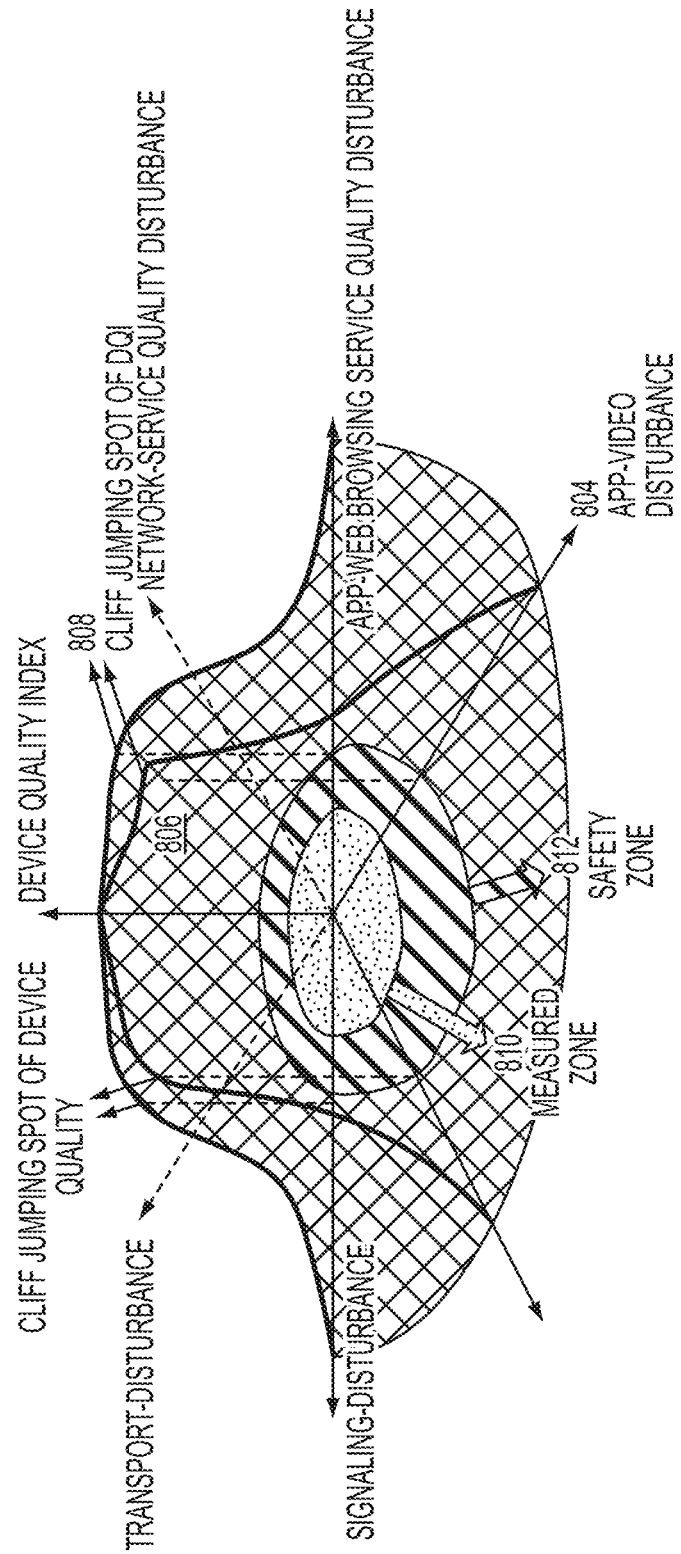
FIG. 8 is an exemplary cliff model in accordance with the implementations.

The analytics engine 31 then identifies cliff points in each dimension of a multi-dimensional surface fitted to each computed curve. Each cliff point corresponds to a reduction in a user's quality of experience in a particular area of operational performance (e.g., network performance, browser performance, signalling performance, etc.) represented by a corresponding dimension. The reduction may be associated with the service disturbances. Referring to FIG. 8, these service disturbances can include, but are not limited to, application video disturbances, web browsing disturbances, network service quality disturbances, transport disturbances and signaling disturbances. For example, axis 804 represents an application video disturbance. Cliff point 806 is a DQI value at which the application video disturbance increases significantly. As a result, the DQI drops significantly after cliff point 806 resulting in a cliff-like feature. Similar cliff points are observed for other areas of operational performance. For example, cliff point 808 is a DQI value at which the web browsing quality disturbance increases significantly. As a result, the DQI drops significantly after cliff point 808 resulting in a cliff-like feature. The analytics engine 31 then projects the identified cliff points in each dimension of the multi-dimensional surface to determine a horizontal space in the multi-dimensional surface corresponding to a region of acceptable DQIs. Thus, the analytics engine 31 expands a two-dimensional relation to multi-dimensional spaces. In this way, the multi-dimensional surface represents DQI as a comprehensive index to reflect users' device quality experience in many dimensions.

In some implementations, the analytics engine 31 can "cycle" or traverse the horizontal space 812 to be plotted by the projected points. Referring to FIG. 8, this horizontal space 812 can be considered to be a "safety zone." As an example, as long as the measured KPI values of the mobile station 13a in each dimension stay in the scope of safety zone represented by the horizontal space 812, we can conclude that the DQI of the mobile station 13a is acceptable. Zone 810 represents a set of measured values by a given test. The zone 810 may be moveable. For example, in another test the analytics engine 31 may determine that the measured zone 810 is moving towards signaling dimension. Such movement of the measured zone 810 may indicate that the signaling attributes may be close to a quality threshold or a cliff jumping point beyond which the device quality of the mobile station 13a may degrade. In some implementations, this determination may be provided to the OEM of the mobile station 13a for further analysis.

The analytics engine 31 may receive a device quality index (DQI) associated with the mobile station 13a and determine whether the received DQI is within the region of the acceptable DQIs. When the received DQI is determined to be the region of the acceptable DQIs, the analytics engine 31 may determine that the mobile station 13a is of acceptable quality. When the received DQI is not determined to be the region of the acceptable DQIs, the analytics engine 31 may determine that the mobile station 13a may not be of acceptable quality. In this way, for example, the disclosed implementations may evaluate device quality (e.g., quality of mobile device 13a) and can further provide a report describing the evaluated device quality. The report may include parameters considered in evaluating the device quality together with an indication of the device quality relative to pre-determined (or acceptable) quality levels. For example, the report may include an indication of whether the quality of the device is above-par, sub-par or on-par relative to pre-determined (or acceptable) quality levels. The report may be displayed on a user interface of a computing device. The report may be provided as a presentation, spreadsheet, text document, or in any other format. The report may also include animations to illustrate progress of a particular device through a manufacturing cycle. The report may highlight certain performance parameters of the mobile station 13a that may be greater or less than pre-defined baseline parameters.

The disclosed implementations have several benefits. For example, the analytics engine 31 jointly incorporates all the independent device performance indicators in one single model to comprehensively evaluate device performance. The cliff model (e.g., the cliff model of FIG. 8 can be used by the analytics engine 31 to quantitatively identify when and how the device quality of a given device (e.g., the mobile station 13a) starts to degrade. The disclosed implementations, determine a "safety zone" (e.g., the zone 812) in a device quality model. The safety zone represents an area where the quality of a given device (e.g., the mobile station 13a) is acceptable. Cliff jumping spots computed by the analytics engine 31 allow the analytics engine 31 to identify where device quality starts to degrade. As a purely illustrative example, cliff jumping spots may be determined by the analytics engine 31 using $2^{nd}$ partial differential equations. The analytics engine 31 quantifies the relationship between device quality and device performance indicators. The analytics engine 31 also addresses the joint relations among all device performance indicators and how the joint relation impacts device quality.

In this way, the disclosed implementations bridge a technology gap by leveraging a comprehensive analytical methodology and system to evaluate device performance and quality. The algorithms processed by the analytics engine 31 form a unique and novel model to evaluate device quality, which can be expanded to other fields such as network quality, service quality and any other quality testing domain. The analytics engine 31 can compute generalized models which are universal to determine solutions for any quality evaluation related problem. Wireless network provide teams can leverage the analytics engine to estimate device quality and maturity for all the pre-launched and post-launched devices from all the OEMs. The disclosed implementations provide for a neutralized model that is OEM agnostic to identify device quality and performance and can be used to evaluate device quality for pre-launched devices as well as post-launch devices and further provide a report describing the evaluated device quality The enhanced device quality evaluation service under consideration here may be used with touch screen type mobile stations as well as to non-touch type mobile stations. Hence, our simple example shows the mobile station (MS) 13a as a non-touch type mobile station and shows the mobile station (MS) 13 as a touch screen type mobile station. Implementation of the on-line device quality evaluation service may involve at least some execution of programming in the mobile stations as well as implementation of user input/output functions and data communications through the network 15, from the mobile stations.

Those skilled in the art presumably are familiar with the structure, programming and operations of the various type of mobile stations. However, for completeness, it may be useful to consider the functional elements/aspects of two exemplary mobile stations 13a and 13b, at a high-level.

Figure 9:
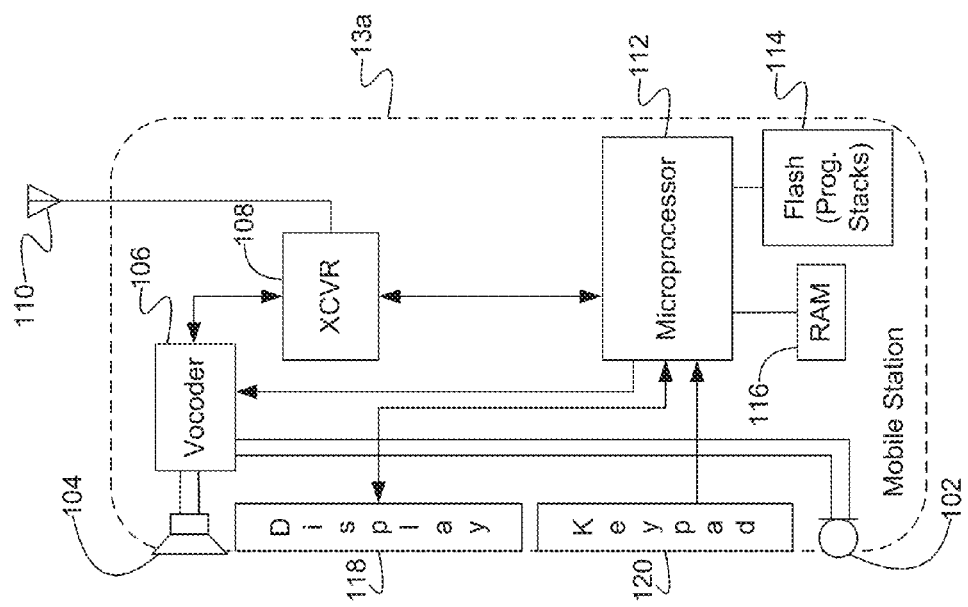
FIG. 9 is a high-level functional block diagram of an exemplary non-touch type mobile station that can be associated with a device quality evaluation service through a network/system like that shown in FIG. 1.

For purposes of such a discussion, FIG. 9 provides a block diagram illustration of an exemplary non-touch type mobile station 13a. Although the mobile station 13a may be a smartphone or may be incorporated into another device, such as a personal digital assistant (PDA) or the like, for discussion purposes, the illustration shows the mobile station 13a is in the form of a handset. The handset embodiment of the mobile station 13a functions as a normal digital wireless telephone station. For that function, the station 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13a also includes at least one digital transceiver (XCVR) 108. Today, the handset 13a would be configured for digital wireless communications using one or more of the common network technology types. The concepts discussed here encompass embodiments of the mobile station 13a utilizing any digital transceivers that conform to current or future developed digital wireless communication standards. The mobile station 13a may also be capable of analog operation via a legacy network technology.

The transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile station 13a includes a display 118 for displaying messages, menus or the like, call related information dialed by the user, calling party numbers, etc., including display of any information from the analytics engine 31. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during operation of the analytics engine 31.

A microprocessor 112 serves as a programmable controller for the mobile station 13a, in that it controls all operations of the mobile station 13a in accord with programming that it executes, for all normal operations, and for operations involved in the device quality evaluation procedure under consideration here. In the example, the mobile station 13a includes flash type program memory 114, for storage of various "software" or "firmware" program routines and mobile configuration settings, such as mobile directory number (MDN) and/or mobile identification number (MIN), etc. The mobile station 13a may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile station 13a includes a processor, and programming stored in the flash memory 114 configures the processor so that the mobile station is capable of performing various desired functions, including in this case the functions involved in the technique for providing parameters needed for device quality evaluation by the analytics engine 31.

Figure 10:
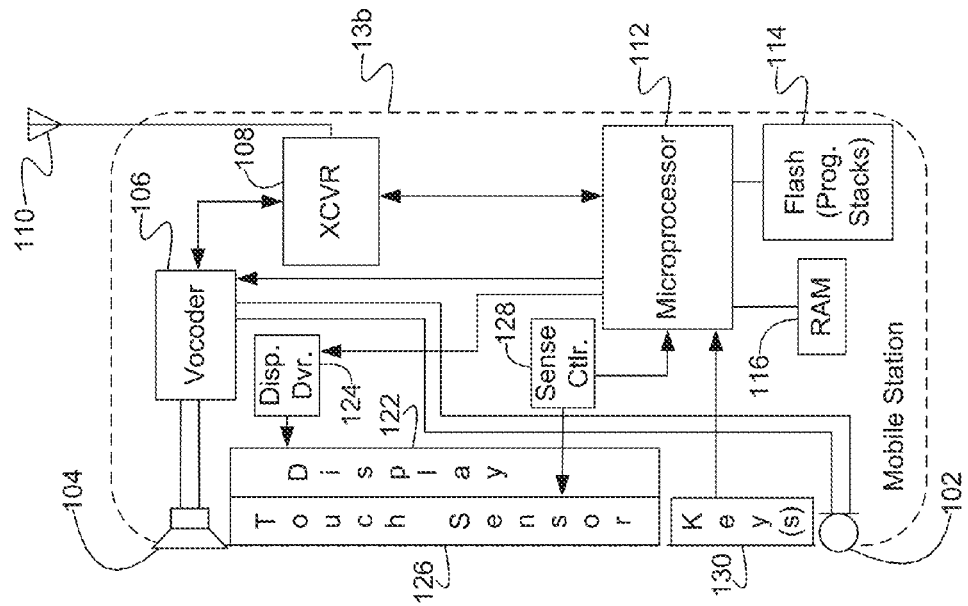
FIG. 10 is a high-level functional block diagram of an exemplary touch screen type mobile station that can be evaluated by the device quality evaluation service through a network/system like that shown in FIG. 1.

For purposes of such a discussion, FIG. 10 provides a block diagram illustration of an exemplary touch screen type mobile station 13b. Although possible configured somewhat differently, at least logically, a number of the elements of the exemplary touch screen type mobile station 13b are similar to the elements of mobile station 13a, and are identified by like reference numbers in FIG. 10. For example, the touch screen type mobile station 13b includes a microphone 102, speaker 104 and vocoder 106, for audio input and output functions, much like in the earlier example. The mobile station 13b also includes a at least one digital transceiver (XCVR) 108, for digital wireless communications, although the handset 13b may include an additional digital or analog transceiver. The concepts discussed here encompass embodiments of the mobile station 13b utilizing any digital transceivers that conform to current or future developed digital wireless communication standards. As in the station 13a, the transceiver 108 provides two-way wireless communication of information, such as vocoded speech samples and/or digital information, in accordance with the technology of the network 15. The transceiver 108 also sends and receives a variety of signaling messages in support of the various voice and data services provided via the mobile station 13b and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

As in the example of station 13a, a microprocessor 112 serves as a programmable controller for the mobile station 13b, in that it controls all operations of the mobile station 13b in accord with programming that it executes, for all normal operations, and for operations involved in the device quality evaluation procedure under consideration here. In the example, the mobile station 13b includes flash type program memory 114, for storage of various program routines and mobile configuration settings. The mobile station 13b may also include a non-volatile random access memory (RAM) 116 for a working data processing memory. Of course, other storage devices or configurations may be added to or substituted for those in the example. Hence, outlined above, the mobile station 13b includes a processor, and programming stored in the flash memory 114 configures the processor so that the mobile station is capable of performing various desired functions, including in this case the functions involved in the technique for providing parameters needed for device quality evaluation by the analytics engine 31.

In the example of FIG. 10, the user interface elements included a display and a keypad. The mobile station 13b may have a limited number of key 130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13b includes a display 122, which the microprocessor 112 controls via a display driver 124, to present visible outputs to the device user. The mobile station 13b also includes a touch/position sensor 126. The sensor 126 is relatively transparent, so that the user may view the information presented on the display 122. A sense circuit 128 sensing signals from elements of the touch/position sensor 126 and detects occurrence and position of each touch of the screen formed by the display 122 and sensor 126. The sense circuit 128 provide touch position information to the microprocessor 112, which can correlate that information to the information currently displayed via the display 122, to determine the nature of user input via the screen.

The display 122 and touch sensor 126 (and possibly one or more keys 130, if included) are the physical elements providing the textual and graphical user interface for the mobile station 13b. The microphone 102 and speaker 104 may be used as additional user interface elements, for audio input and output, including with respect to some device quality evaluation related functions.

The structure and operation of the mobile stations 13a and 13b, as outlined above, were described to by way of example, only.

As shown by the above discussion, functions relating to device quality evaluation may be implemented on computers connected for data communication via the components of a packet data network, operating as the analytics engine 31 as shown in FIG. 1. Although special purpose devices may be used, such devices also may be implemented using one or more hardware platforms intended to represent a general class of data processing device commonly used to run "server" programming so as to implement the device quality evaluation functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for device quality evaluation. The software code is executable by the general-purpose computer that functions as the analytics engine and/or that functions as a GUI rendering device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for evaluating device quality, in essentially the manner performed in the implementations discussed and illustrated herein.

Figures 11, 12:
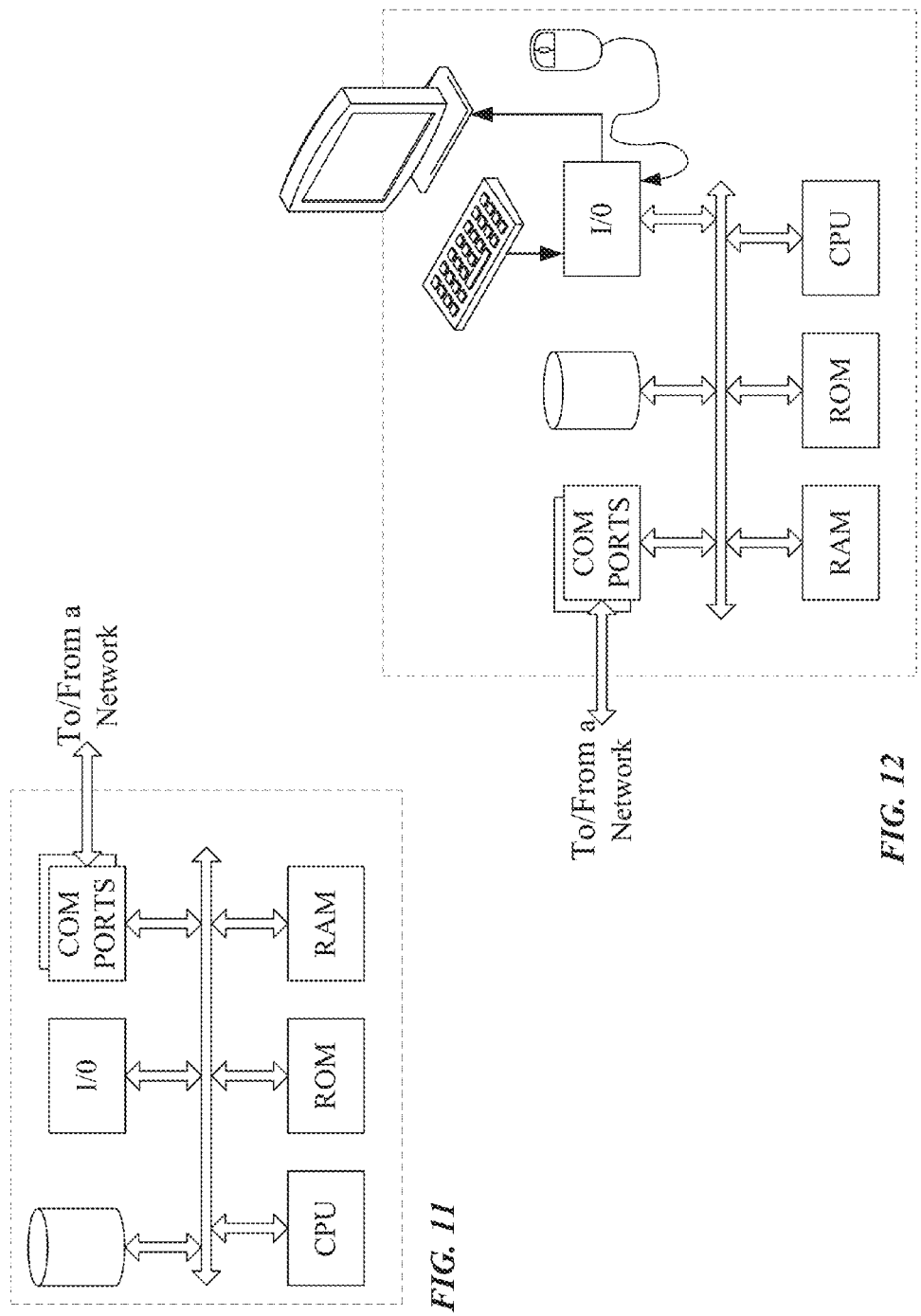
FIG. 11 is a simplified functional block diagram of a computer that may be configured as a host or server, for example, to function as the analytics engine in the system of FIG. 1.
FIG. 12 is a simplified functional block diagram of a personal computer or other work station or terminal device.

FIGS. 11 and 12 provide functional block diagram illustrations of general purpose computer hardware platforms. FIG. 11 is a network or host computer platform, as may typically be used to implement a server. FIG. 12 depicts a computer with user interface elements, as may be used to implement a personal computer or other type of work station or terminal device, although the computer of FIG. 12 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of evaluating device quality outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the wireless network provider into the computer platform that will be the analytics engine. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the analytics engine, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
receiving, at an analytics engine, one or more operational parameters for a mobile device, wherein the operational parameters include data related to service disturbances in a plurality of areas of operational performance of the mobile device;
computing, at the analytics engine, for each dimension of a plurality of dimensions, a curve indicative of a relationship between a device quality index (DQI) of the mobile device for a particular dimension and operational parameters of the mobile device for the particular dimension, wherein each dimension of the plurality of dimensions corresponds to a particular area of operational performance of the mobile device;
identifying, at the analytics engine, cliff points in each dimension of a multi-dimensional surface fitted to each computed curve, wherein each cliff point corresponds to a reduction in a user's quality of experience in a particular area of operational performance represented by a corresponding dimension, the reduction associated with the service disturbances;
projecting, at the analytics engine, the identified cliff points in each dimension of the multi-dimensional surface to determine a horizontal space in the multi-dimensional surface corresponding to a region of acceptable DQIs; and
generating, based on the projecting, a device quality evaluation report for the plurality of areas of operational performance of the mobile device.

2. The method of claim 1, further comprising:
receiving, at an analytics engine, a DQI associated with the mobile device;
determining whether the received DQI is within the region of the acceptable DQIs; and
when the received DQI is determined to be within the region of the acceptable DQIs, determining that the mobile device is of acceptable quality.

3. The method of claim 1, further comprising:
receiving, at an analytics engine, one or more updated operational parameters for the mobile device, wherein the updated operational parameters include updated data related to service disturbances in the plurality of areas of performance of the mobile device; and
repeating the computing, the identifying and the projecting with the updated data to determine an updated horizontal space in the multi-dimensional surface corresponding to an updated region of acceptable DQIs.

4. The method of claim 3, further comprising:
comparing a position of the updated horizontal space to a position of previously determined horizontal space to determine whether the updated horizontal space is located at a different position than the previously determined horizontal space; and
when the updated horizontal space is located at the different position than the previously determined horizontal space, determining whether the different position is located closer to a particular dimension relative to other dimensions of the plurality of dimensions.

5. The method of claim 4, further comprising:
when the position is located closer to the particular dimension relative to the other dimensions, determining that the operational parameters associated with the particular dimension relative to the other dimensions are closer to a cliff point associated with the particular dimension.

6. The method of claim 1, wherein the areas of performance of the mobile device include one or more of a hardware performance, software performance, network performance or signaling performance.

7. The method of claim 1, wherein the curve is a two-dimensional curve with DQIs representing a first dimension and operational parameters representing a second dimension.

8. An analytics engine comprising:
a communication interface configured to enable communication via a mobile network;
a processor coupled with the communication interface;
a storage device accessible to the processor; and
an executable program in the storage device, wherein execution of the program by the processor configures the server to perform functions, including functions to:
receive, at an analytics engine, one or more operational parameters for a mobile device, wherein the operational parameters include data related to service disturbances in a plurality of areas of operational performance of the mobile device;
compute, at the analytics engine, for each dimension of a plurality of dimensions, a curve indicative of a relationship between a device quality index (DQI) of the mobile device for a particular dimension and operational parameters of the mobile device for the particular dimension, wherein each dimension of the plurality of dimensions corresponds to a particular area of operational performance of the mobile device;
identify, at the analytics engine, cliff points in each dimension of a multi-dimensional surface fitted to each computed curve, wherein each cliff point corresponds to a reduction in a user's quality of experience in a particular area of operational performance represented by a corresponding dimension, the reduction associated with the service disturbances;
project, at the analytics engine, the identified cliff points in each dimension of the multi-dimensional surface to determine a horizontal space in the multi-dimensional surface corresponding to a region of acceptable DQIs; and
generate, based on the projection, a device quality evaluation report for the plurality of areas of operational performance of the mobile device.

9. The analytics engine of claim 8, wherein execution of the program by the processor configures the server to perform functions, including functions to:
receive, at an analytics engine, DQI associated with the mobile device;
determine whether the received DQI is within the region of the acceptable DQIs; and
when the received DQI is determined to be within the region of the acceptable DQIs, determine that the mobile device is of acceptable quality.

10. The analytics engine of claim 8, wherein execution of the program by the processor configures the server to perform functions, including functions to:
receive, at an analytics engine, one or more updated operational parameters for the mobile device, wherein the updated operational parameters include updated data related to service disturbances in the plurality of areas of performance of the mobile device; and
repeat the computing, the identifying and the projecting with the updated data to determine an updated horizontal space in the multi-dimensional surface corresponding to an updated region of acceptable DQIs.

11. The analytics engine of claim 10, wherein execution of the program by the processor configures the server to perform functions, including functions to:
   compare a position of the updated horizontal space to a position of previously determined horizontal space to determine whether the updated horizontal space is located at a different position than the previously determined horizontal space; and
   when the updated horizontal space is located at the different position than the previously determined horizontal space, determine whether the different position is located closer to a particular dimension relative to other dimensions of the plurality of dimensions.

12. The analytics engine of claim 11, wherein execution of the program by the processor configures the server to perform functions, including functions to:
   when the position is located closer to the particular dimension relative to the other dimensions, determine that the operational parameters associated with the particular dimension relative to the other dimensions are closer to a cliff point associated with the particular dimension.

13. The analytics engine of claim 8, wherein the analytics engine incrementally learns operational parameters from the mobile device and optimizes one or more algorithms used by the analytics engine.

14. The analytics engine of claim 8, wherein the curve is a two-dimensional curve with DQIs representing a first dimension and operational parameters representing a second dimension.

15. A non-transitory computer-readable medium comprising instructions which, when executed by one or more computers, cause the one or more computers to:
   receive, at an analytics engine, one or more operational parameters for a mobile device, wherein the operational parameters include data related to service disturbances in a plurality of areas of operational performance of the mobile device;
   compute, at the analytics engine, for each dimension of a plurality of dimensions, a curve indicative of a relationship between a device quality index (DQI) of the mobile device for a particular dimension and operational parameters of the mobile device for the particular dimension, wherein each dimension of the plurality of dimensions corresponds to a particular area of operational performance of the mobile device;
   identify, at the analytics engine, cliff points in each dimension of a multi-dimensional surface fitted to each computed curve, wherein each cliff point corresponds to a reduction in a user's quality of experience in a particular area of operational performance represented by a corresponding dimension, the reduction associated with the service disturbances;
   project, at the analytics engine, the identified cliff points in each dimension of the multi-dimensional surface to determine a horizontal space in the multi-dimensional surface corresponding to a region of acceptable DQIs; and
   generate, based on the projection, a device quality evaluation report for the plurality of areas of operational performance of the mobile device.

16. The computer-readable medium of claim 15 further comprising instructions which, when executed by the one or more computers, cause the one or more computers to:
   receive, at an analytics engine, a DQI associated with the mobile device;
   determine whether the received DQI is within the region of the acceptable DQIs; and
   when the received DQI is determined to be within the region of the acceptable DQIs, determine that the mobile device is of acceptable quality.

17. The computer-readable medium of claim 15 further comprising instructions which, when executed by the one or more computers, cause the one or more computers to:
   receive, at an analytics engine, one or more updated operational parameters for the mobile device, wherein the updated operational parameters include updated data related to service disturbances in the plurality of areas of performance of the mobile device; and
   repeat the computing, the identifying and the projecting with the updated data to determine an updated horizontal space in the multi-dimensional surface corresponding to an updated region of acceptable DQIs.

18. The computer-readable medium of claim 17 further comprising instructions which, when executed by the one or more computers, cause the one or more computers to:
   compare a position of the updated horizontal space to a position of previously determined horizontal space to determine whether the updated horizontal space is located at a different position than the previously determined horizontal space; and
   when the updated horizontal space is located at the different position than the previously determined horizontal space, determine whether the different position is located closer to a particular dimension relative to other dimensions of the plurality of dimensions.

19. The computer-readable medium of claim 18 further comprising instructions which, when executed by the one or more computers, cause the one or more computers to:
   when the position is located closer to the particular dimension relative to the other dimensions, determine that the operational parameters associated with the particular dimension relative to the other dimensions are closer to a cliff point associated with the particular dimension.

20. The computer readable medium of claim 15, wherein the areas of performance of the mobile device include one or more of a hardware performance, software performance, network performance or signaling performance.

* * * * *